US005855341A

United States Patent [19]
Aoki et al.

[11] Patent Number: 5,855,341
[45] Date of Patent: Jan. 5, 1999

[54] METHOD OF CONTROLLING A PLURALITY OF SATELLITES

[75] Inventors: Hiroko Aoki; Osamu Iijima, both of Tokyo, Japan

[73] Assignee: Fujitsu Limited, Kawasaki, Japan

[21] Appl. No.: 780,394

[22] Filed: Jan. 8, 1997

Related U.S. Application Data

[63] Continuation of Ser. No. 350,046, Nov. 29, 1994, abandoned.

[30] Foreign Application Priority Data

Mar. 31, 1994 [JP] Japan ..................................... 6-061917

[51] Int. Cl.⁶ ...................................................... B64G 1/10
[52] U.S. Cl. ........................................ 244/176; 244/158 R
[58] Field of Search ................................ 244/158 R, 176, 244/171, 164

[56] References Cited

U.S. PATENT DOCUMENTS

| | | | |
|---|---|---|---|
| 3,521,835 | 7/1970 | Braga-Illa et al. | 244/171 |
| 3,638,882 | 2/1972 | Turriere | 244/158 R |
| 4,691,882 | 9/1987 | Young | 244/158 R |
| 5,120,007 | 6/1992 | Pocha et al. | 244/158 R |

FOREIGN PATENT DOCUMENTS 438 229  7/1991  European Pat. Off. .

OTHER PUBLICATIONS

Mcgraw–Hill Encyclopedia of Science & Technology, 7th Edition, vol. 3, pp. 325–328.
Mcgraw–Hill Encyclopedia of Science & Technology, 7th Edition, vol. 6, p. 315.
Mcgraw–Hill Encyclopedia of Science & Technology, 7th Edition, vol. 12, pp. 484–486.
J.G. Meitner, Astronautics for Science Teachers, John Wiley & Sons, Inc., New York, 1965, pp. 130–135.
W.T. Thompson, Introduction to Space Dynamics, Wiley, N.Y., 1961, pp. 32–35, pp. 58–59 & pp. 64–65.
M. Utashima et al, East–West Station–Keeping Maneuver, Proc. Int. Syp. Spacecraft Flight Dynamics, Darmstadt, FRG, 18–22 May 1981 (ESA SP–160, Aug. 1981), pp. 407–415.

*Primary Examiner*—William Grant
*Assistant Examiner*—Tien Dinh
*Attorney, Agent, or Firm*—Staas & Halsey

[57] ABSTRACT

A satellite control method is provided for keeping at an identical longitude a plurality of geostationary satellites in which east-west velocity increment (NS coupling) during the execution of north-south orbit control is not negligible. Eccentricity vectors of the geostationary satellites are localized to ensure a large difference therebetween, such that the circumferences of circles, which indicate the ranges of variation of the eccentricity vectors due to the radiation pressure of the sun and NS coupling, do not overlap and are separated from one another at a distance at least greater than a specified minimum inter-satellite distance.

9 Claims, 5 Drawing Sheets

PRIOR ART

METHOD OF CONTROLLING A PLURALITY OF SATELLITES

This application is a continuation, of application Ser. No. 08/350,046, filed Nov. 29, 1994, now abandoned.

BACKGROUND OF THE INVENTION

(1) Field of the Invention

The present invention relates to a method of controlling a plurality of satellites, and more particularly, to a satellite control method for maintaining a plurality of geostationary satellites at an identical longitude in which east-west velocity increment (NS coupling) during the execution of north-south orbit control is not negligible.

(2) Description of the Related Art

Satellites launched at an altitude of about 36,000 km above the equator of the earth synchronously revolve around the earth one rotation in about a day. Accordingly, when viewed from the earth, such satellites look as if they were fixed (stationary) at a point above the equator. Usually, however, the position of a geostationary satellite is not always the same, but the equatorial plane of the satellite may deviate from the equatorial plane or the semimajor axis of the orbit may vary due to the influence of various forces. Therefore, control operation is periodically executed to remedy such deviations. A control operation to move the satellite north or south toward the equatorial plane is called NS control, while a control operation to correct a deviation of the satellite within the orbital plane is called EW control. To achieve these control operations, the position of the satellite is monitored at all times from a ground station, and when position correction is required, a command is transmitted to the satellite to correct the orbit thereof. Satellites are equipped with thrusters for producing propelling forces, and their orbits are corrected by means of velocity increment vectors obtained through controlled injection of fuel from the thrusters.

Conventionally, when keeping a plurality of geostationary satellites at an identical longitude, particularly where the number of geostationary satellites is two, a method called longitude separation is generally employed. Since the position of a geostationary satellite is not always the same, a hold range is set and the satellite is controlled so as to be within the hold range. In the longitude separation method, the hold range is divided into two along the orbit and two satellites are positioned in respective subdivided ranges. For example, the sky in the vicinity of 110° of east longitude is allotted to Japanese broadcasting satellites, and within a hold range of ±0.1°, one of the two satellites is positioned in a positive (+) 0.1° range while the other is positioned in a negative (−) 0.1° range.

Another method called orbital plane separation is also known wherein the orbital planes of respective satellites, i.e., the angles of inclination of the orbits, are made different from each other to avoid collision, thereby separating the orbital inclination angle vectors.

In the event the number of satellites becomes large and the longitude separation method or the orbital plane separation method is no longer applicable, a method called eccentricity separation can be used wherein a plurality of satellites is separated within a plane. The eccentricity separation method will be explained with reference to FIG. 5.

FIG. 5 illustrates a conventional sun-synchronous eccentricity separation method. A Cartesian coordinate system is defined with the earth at the center and a pair of mutually orthogonal axes η and ξ. In the illustrated example, four geostationary satellites A, B, C and D are positioned at the same longitude. Eccentricity vectors of the geostationary satellites A, B, C and D are indicted respectively at $e_A$, $e_B$, $e_C$ and $e_D$. The eccentricity vector is a vector having a magnitude equal to the eccentricity and directed along the major axis of an ellipse in the direction of perigee. Perigee is the single point in an elliptical satellite orbit which is closest to the center of the earth. Since the four satellites have respective different eccentricities, they move along paths separated from one another but within the same hold range. The satellites are separated by their eccentricity, hence the method is called eccentricity separation. The eccentricity vectors are greatly influenced by the radiation pressure of the sun, and the points thereof describe circles a, b, c and d, respectively, in a year. Although the circles a, b, c and d intersect one another at several points, the points of the eccentricity vectors rotate synchronously during circling; therefore, the distances between the points of the vectors are always ensured and the satellites do not collide with one another. Thus the conventional eccentricity separation method utilizes the sun-synchronous rotation of the eccentricity. An outer circle R represents an allowable range for the eccentricity, and is calculated from the hold range of the stationary longitude. In other words, each satellite must remain in a respective stationary hold range with respect to a predetermined longitude. Thus, R represents an acceptable margin of error in the satellite orbit.

In large-sized three-axis attitude controlled satellites, variation in the eccentricity vector due to NS coupling is too large to be neglected, possibly causing the eccentricity vector to greatly deviate from the circle of rotation shown in FIG. 5. The NS coupling indicates the phenomenon that NS control for controlling the orbit north or south also affects the east-west position of the satellite. In the case of a box-shaped three-axis satellite, the time of execution of the NS control is long, and during this control period, the attitude of the satellite becomes unstable. To properly control the attitude, an EW control thruster automatically operates, thus changing the eastwest position of the satellite. Also when ejected gas impinges on a paddle and is reflected thereat, a propelling force in the EW direction is produced. Thus, when the NS control is executed, it eventually entails the EW control. Consequently, in some cases, a minimum inter-satellite distance cannot be secured. The point of the eccentricity vector rotates under the influence of the radiation pressure of the sun, as mentioned above, and the radius of the rotation is determined by the size (sectional area) and weight of the satellite.

Where the satellites to be controlled are large-sized three-axis attitude controlled satellites, the conventional sun-synchronous eccentricity separation method can only keep a maximum of three satellites in position, though eccentricity vector variations due to large NS coupling or the solar radiation pressure depend upon the performance of the propulsion system and the size and weight of the satellites.

SUMMARY OF THE INVENTION

The present invention is created in view of the above circumstances, and an object thereof is to provide a method of controlling a plurality of satellites whereby a plurality of geostationary satellites which are subject to large NS coupling can be kept at an identical longitude.

To achieve the above object, there is provided a satellite control method for keeping a plurality of geostationary satellites at a substantially identical longitude. The satellite control method comprises controlling a plurality of satellites in such a manner that variation ranges of eccentricity vectors of the satellites do not overlap one another.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be now described in detail with reference to the drawings.

Figure 1:
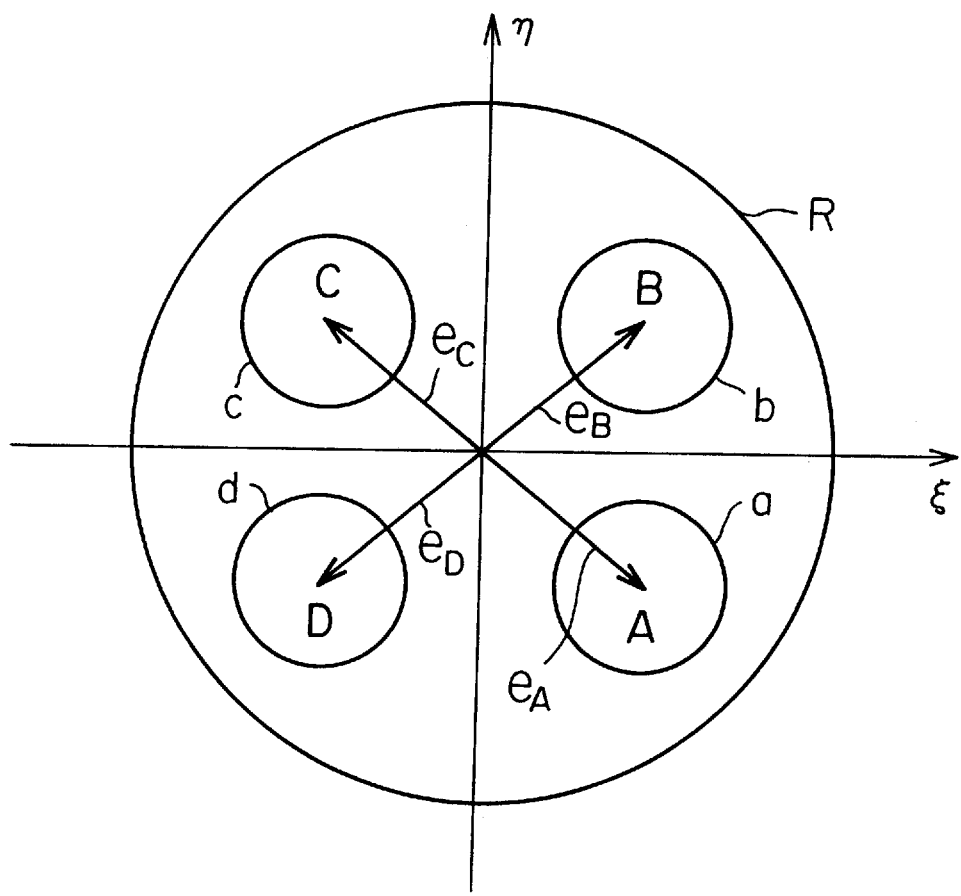
FIG. 1 is a diagram illustrating a complete eccentricity separation method according to the present invention.

FIG. 1 illustrates not only the principles of the present invention but also the embodiment. As shown in FIG. 1, the eccentricity vectors $e_A$, $e_B$, $e_C$ and $e_D$ of geostationary satellites A, B, C and D are localized such that adjacent ones thereof form an angle of about 90°. An outer circle R represents an allowable maximum eccentricity range and is calculated from an under-orbit longitudinal range corresponding, e.g., to ±0.1°. The points of the eccentricity vectors are situated within the circles a, b, c and d, respectively. The circles a, b, c and d each represent the range of variation of the corresponding eccentricity vector caused by the radiation pressure of the sun and the NS coupling. In order to keep a plurality of geostationary satellites at an identical longitude, an optimum disposition of the eccentricity vectors is derived such that the smallest distance between the circumferences of the circles a, b, c and d is greater than the specified minimum inter-satellite distance, and hold control is executed so that the eccentricity vectors may always have the optimum values.

The eccentricity vectors $e_A$, $e_B$, $e_C$ and $e_D$ in the illustrated positions denote optimum values or target values to be controlled to. In the hold control, a control plan is formulated so as to correct variations of the eccentricity vectors from the optimum values caused by the solar radiation pressure and the NS coupling. In accordance with the control plan, the eccentricity vectors of the satellites are controlled such that the points thereof are always situated within the corresponding circles a, b, c and d. In the following, this method is referred to as the complete eccentricity separation method, as opposed to the sun-synchronous eccentricity separation method, because the eccentricity vectors of the satellites are completely separated. According to the complete eccentricity separation method, the angular distance between the eccentricity vectors of the satellites can be set to a larger value, as compared with the sun-synchronous eccentricity separation method, and thus it is possible to keep in position three or more satellites which are subject to large NS coupling.

To actually carry out the hold control, first, the size and weight of each satellite is computed. Assuming that the satellites each have a spherical body, the sectional area of the spherical body as viewed from the direction of the sun, i.e., the effective sectional area, is used as the size of the satellite. As the sizes of the satellites are calculated, variations of the eccentricity vectors can be determined. Then, the allowable eccentricity range, i.e., the under-orbit longitudinal range, is determined, followed by the determination of a day-based control period. After a minimum inter-satellite distance of, e.g., 10 km, is specified based on these parameters, the size of the outer diameter R and the radii of the circles a, b, c and d are determined. The centers of the circles a, b, c and d can now be located such that the circles touch the outer circle R; accordingly, a plan is formulated such that the eccentricity vectors point to the centers of the respective circles, and the satellites are controlled in accordance with the plan.

Figure 2:
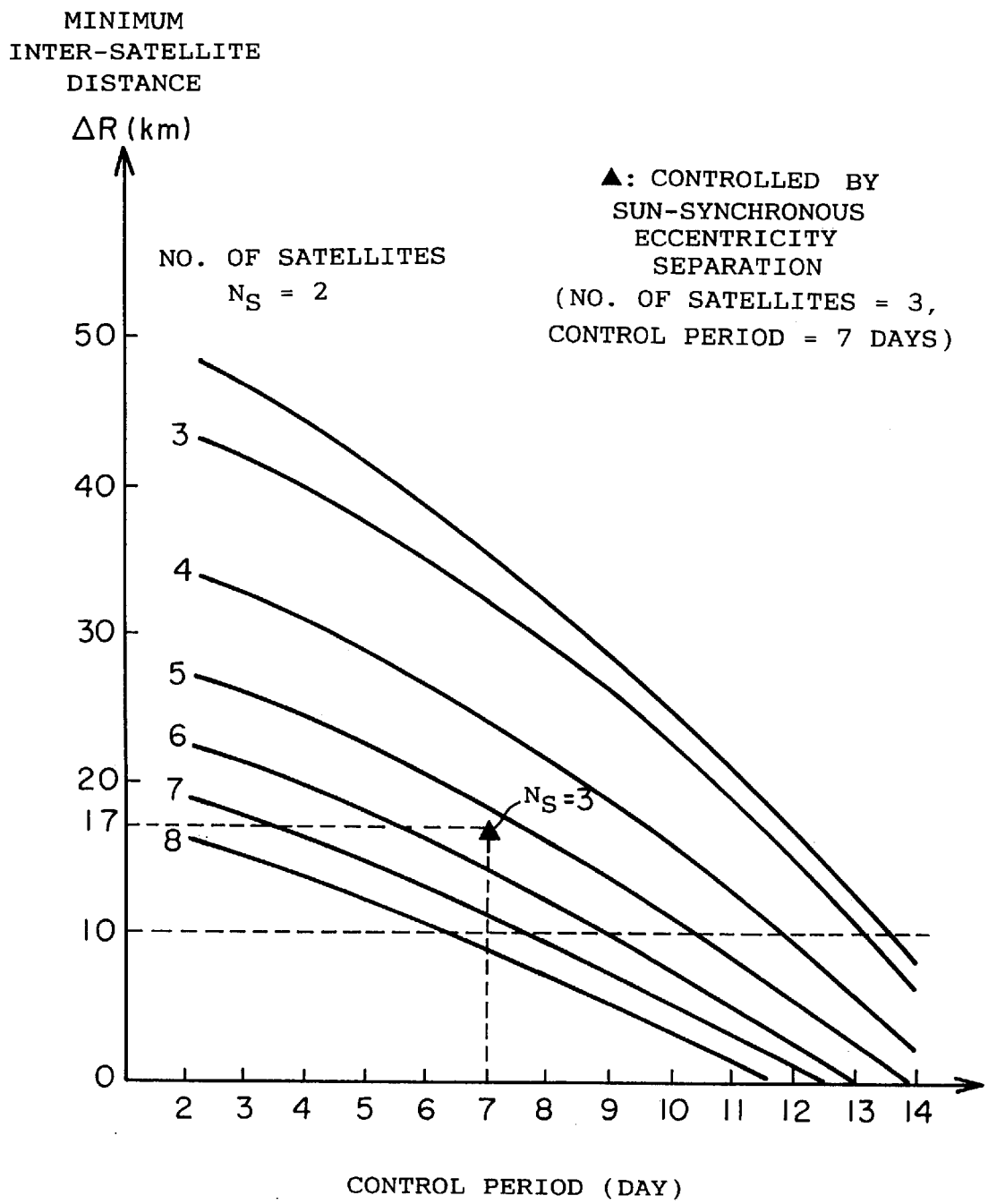
FIG. 2 is a graph showing an example of numerical analysis according to the complete eccentricity separation method.

FIG. 2 shows an example of numerical analysis according to the complete eccentricity separation method. The graph of FIG. 2 shows the results of the analysis wherein, provided a plurality of geostationary satellites is kept at an identical longitude according to the complete eccentricity separation method, the control period at which the minimum inter-satellite distance of, e.g., 10 km, can be ensured and the number of simultaneously controllable satellites are derived. The analysis is based on the assumption that the satellites are kept within a range of 110°+0.1° of east longitude. Parameters used in the analysis are as follows:

a) Satellite Constants:
  Reflection coefficient $C_R$=1.36
  Effective sectional area S=18.4 m$^2$
  Mass W=594.5 kg b) Operational Parameters:
  Drift acceleration $\lambda$=-1.9×10$^{-3}$ deg/day$^2$ (in the vicinity of 110° of east longitude)
  Hold range (under-orbit longitudinal range) $\Delta\lambda$=0.2 deg
  Orbit semimajor axis determination error $\Delta\lambda$a=50 m
  Longitude determination error $\delta\lambda_{op}$=0.005 deg c) NS Coupling Parameters:
  $\Delta V$ radius direction component $\Delta V_R$=0.0648 m/sec (3% of $\Delta V_{NS}$)
  $\Delta V$ tangential direction component $\Delta V_T$0.0432 m/sec (2% of $\Delta V_{NS}$)
  NS-EW period $\Delta t_{NSEW}$=2 days FIG. 2 shows changes in the minimum intersatellite distances $\Delta R$ with different control periods where the number of satellites $N_S$ is varied from 3 to 8. As seen from the graph, where the control period is 7 days, up to seven satellites can be kept in position by the complete eccentricity separation method. In the case where four satellites are to be kept in position, the control period can be prolonged to 12 days at the longest. Where five to eight satellites are to be kept in position, the eccentricity vectors are separated in four regions, as shown in FIG. 1, and each eccentricity is subjected to longitude separation, whereby up to eight satellites can be kept in position.

In the case where three satellites are kept in position at a control period of 7 days according to the conventional sun-synchronous eccentricity separation method, the minimum inter-satellite distance is 17 km (indicated by ▲ in FIG. 2). Thus, it is not possible to keep four or more satellites in position by the conventional method.

The analysis shown in FIG. 2 is based on the premise that all satellites are on the same orbital plane. Accordingly, if separate orbital planes are employed, the inter-satellite distance can be set to an even greater value.

Figure 3:
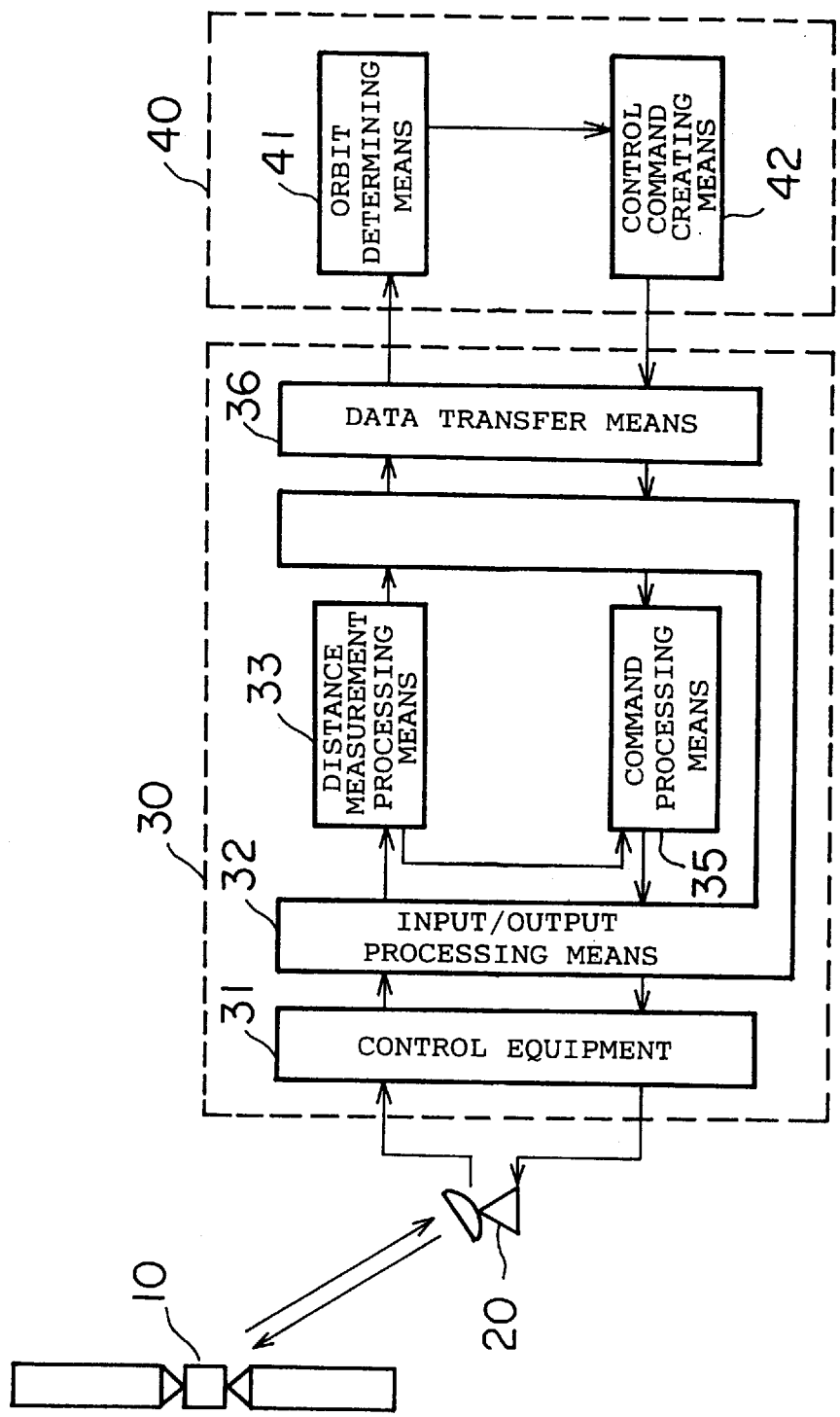
FIG. 3 is a block diagram of a system at a ground station.

FIG. 3 is a block diagram of a system at a ground station. The ground station comprises an antenna 20 for transmitting command signals to a satellite 10 and receiving various data from the satellite 10, an on-line operation control section 30, and an off-line job scheduler section 40. The operation control section 30 includes control equipment 31 connected to one or a plurality of antennas 20, input/output processing unit 32, distance measurement processing unit 33, command processing unit 35, and data transfer unit 36. The job scheduler section 40 includes orbit determining unit 41 and control command creating unit 42.

To permit the satellite 10 to be located, the satellite receives a radio wave transmitted from the ground station and sends the received radio wave back to the ground station so that a distance thereof and the rate of change in the distance may be measured. To achieve the measurement, first, a distance measurement command is supplied from the distance measurement processing unit 33 to the command processing unit 35 in the operation control section 30. In response to the command, the command processing unit 35 transmits, in cooperation with the input/output processing unit 32 and the control equipment 31, a radio wave for distance measurement to the satellite 10 from the antenna 20. The satellite 10 is equipped with a transponder which, on receiving the radio wave, sends back the radio wave to the ground station after modulating the carrier wave. The radio wave transmitted from the satellite 10 is received by the antenna 20 and then supplied via the control equipment 31 and the input/output processing unit 32 to the distance measurement processing unit 33 of the operation control section 30 as distance measurement data, whereupon the distance measurement processing unit 33 computes the distance and the rate of change in the distance. Observation of the distance and the rate of change in the distance is continued for, e.g., 24 hours, and such observation is carried out at a frequency of twice or three times a week.

The distance measurement data thus obtained is transferred via the data transfer unit 36 to the orbit determining unit 41 in the job scheduler section 40. Based on the distance measurement data, the orbit determining unit 41 computes orbit determination values representing the position and velocity of the satellite at a certain time. The orbit determination values include six orbital elements, i.e., the semimajor axis a of the elliptic orbit, the eccentricity e, the orbit inclination angle i, which is the angle between the orbital plane and the equatorial plane, the right ascension $\Omega$ of the ascending node of the orbital plane measured eastward from the vernal equinox along the equatorial plane, the perigee argument $\omega$ indicating the orientation of the orbit, and the mean anomaly M. The computed orbit determination values are supplied to the control command creating unit 42. The control command creating unit 42 determines based on the rates of change in the orbital elements whether any satellite is likely to deviate from the predetermined hold range. If it is predicted that a satellite will deviate from the predetermined hold range, the control command creating unit 42 formulates a control plan to avoid such deviation, i.e., a control plan to correct variation of the set eccentricity vector of the satellite from the optimum value, and then creates a control command to implement the control plan. The control command created by the control command creating unit 42 is supplied to the command processing unit 35 via the data transfer unit 36 of the operation control section 30, and is converted to required command data by the command processing unit 35. The command data is transferred via the input/output processing unit 32 and the control equipment 31 to the antenna 20, and transmitted therefrom to the satellite 10. In accordance with the received command data, the satellite 10 executes a control operation to correct the orbit thereof.

Figure 4:
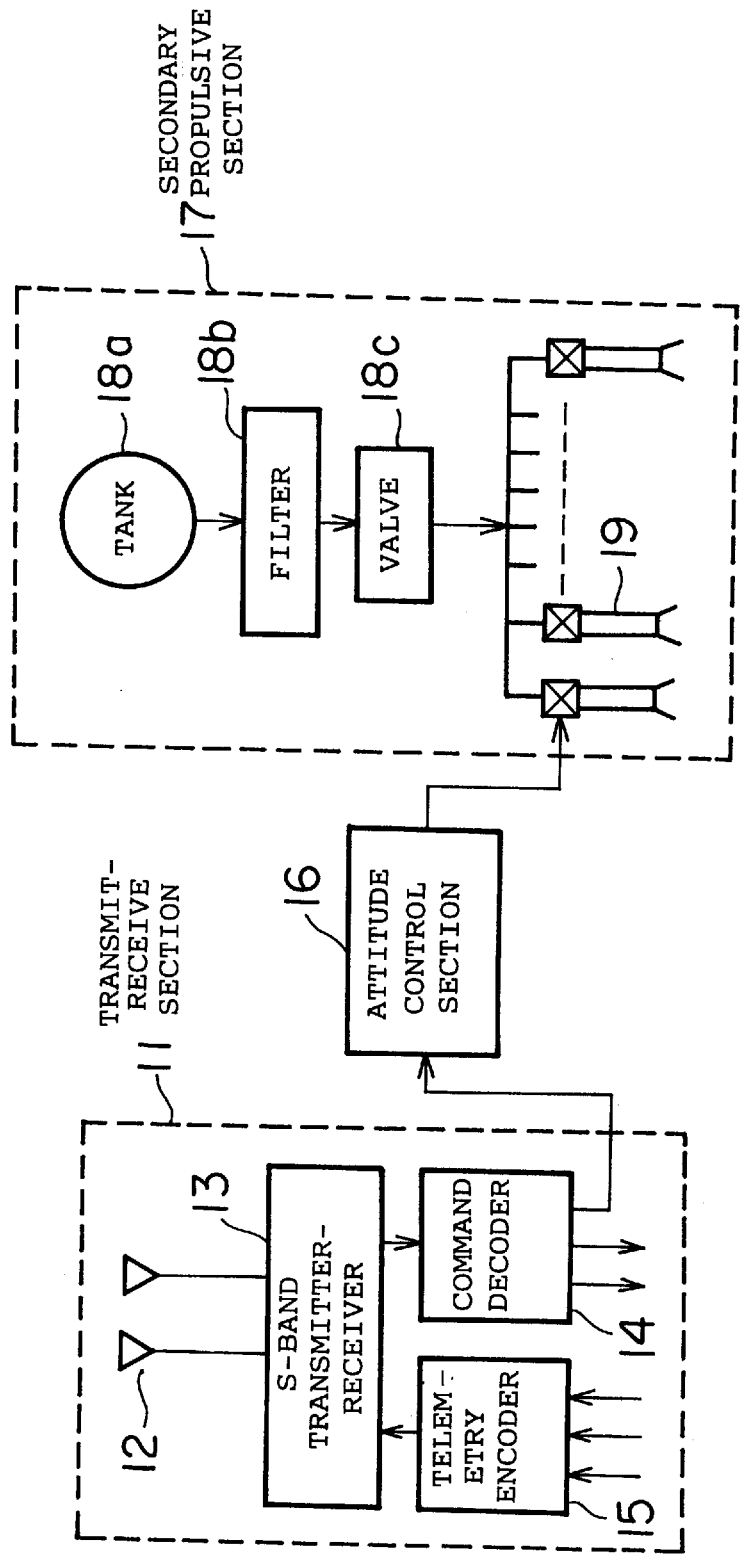
FIG. 4 is a block diagram of an orbit control system in a satellite.

FIG. 4 is a block diagram of an orbit control system in the satellite. The orbit control system of the satellite has a transmit-receive section 11 for communicating with the ground station. The transmit receive section 11 comprises a transmitting/receiving S-band antenna 12, an S-band transmitter-receiver 13, a command decoder 14 for decoding the command data from the ground station, and a telemetry encoder 15 for converting measurement data, supplied thereto from various measuring instruments in the satellite, to signals to be transmitted to the ground station. Although not illustrated in the figure, a transponder is incorporated in the S-band transmitter-receiver 13. An output of the command decoder 14 is connected to an attitude control section 16, the output of which is connected to a secondary propulsive section 17. The secondary propulsive section 17 includes a tank 18a for storing fuel, a filter 18b, a valve 18c, and a plurality of thrusters 19.

The command data for obtaining a velocity increment vector for the orbit correction, planned by the control command creating unit 42 and transmitted from the ground station, is supplied to the command decoder 14 via the S-band antenna 12 and the S-band transmitter-receiver 13. The command decoder 14 decodes the input command data and supplies the decoded data to the attitude control section 16. The attitude control section 16 outputs thruster commands in accordance with the control command from the ground station. When supplied with the thruster commands, those thrusters 19 of the secondary propulsive section 17, which are specified by the commands for the orbit correction, inject respective required amounts of fuel supplied thereto from the tank 18a via the filter 18b and the valve 18c. Injecting fuel from the thrusters 19 makes it possible to correct the orbit of the satellite in accordance with the plan.

As described above, according to the present invention, the eccentricity vectors of satellites are completely separated. This permits up to eight large-sized satellites to be kept in position at a control period of five days, while ensuring a minimum inter-satellite distance of 10 km.

In the conventional sun-synchronous eccentricity separation method, each time control operation is executed, the target eccentricity vectors must be set in accordance with the position of the sun. By contrast, according to the present invention, since the target values for the eccentricity vectors to be controlled are fixed, control plans can be easily formulated.

Figure 5:
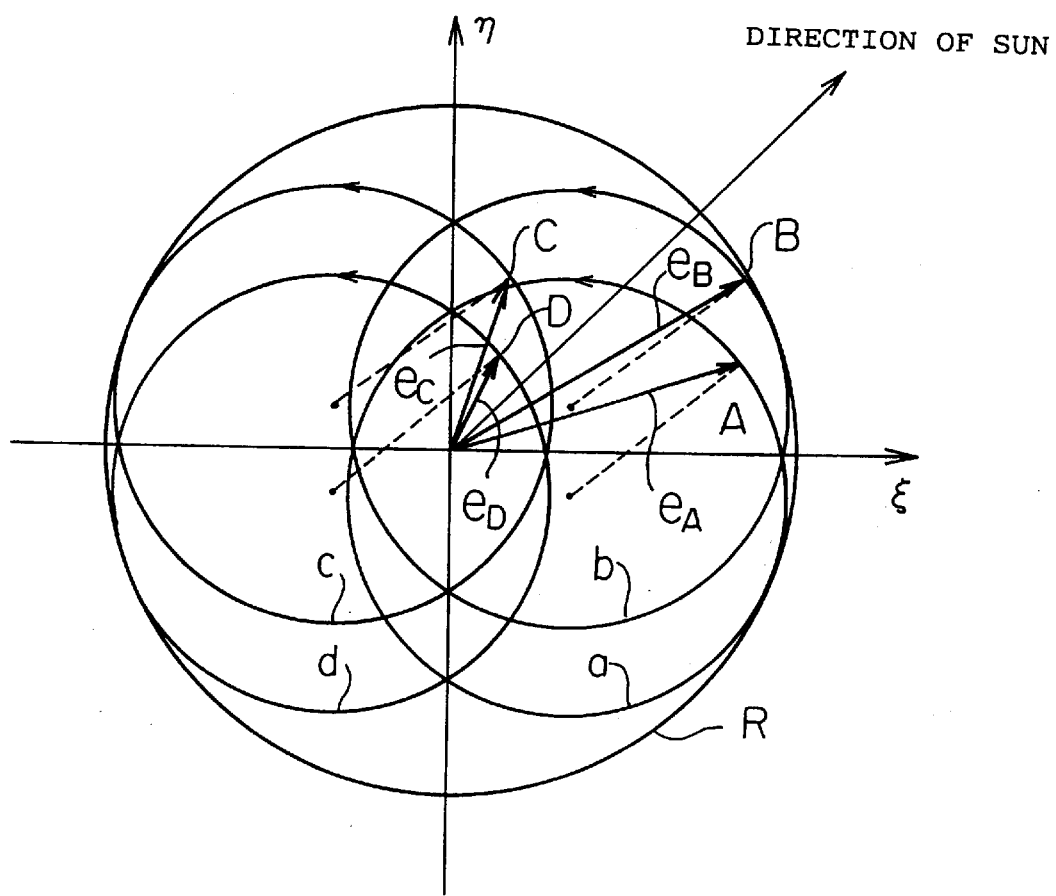
FIG. 5 is a diagram illustrating a conventional sun-synchronous eccentricity separation method.

FIG. 5 depicts a diagram illustrating a conventional sun-synchronous eccentricity separation method.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications; and equivalents may be regarded as falling within the scope of the invention in the appended claims and their equivalents.

What is claimed is:

1. A satellite control method for controlling orbits of a plurality of geostationary satellites, comprising:
defining an orbital plane by a pair of mutually orthogonal axes intersecting at the planet center, wherein the orbit of each satellite is respectively represented within the orbital plane by an eccentricity vector extending from the intersection of the axes to orbit perigee;
determining variation ranges for each eccentricity vector due to solar radiation pressure and NS control; and
controlling the plurality of geostationary satellites within the same orbital plane such that the variation ranges of the eccentricity vectors do not overlap.

2. The satellite control method according to claim 1, wherein each of said eccentricity vectors have a direction perpendicular from each other.

3. A satellite control device for maintaining a plurality of elliptical orbits of geostationary satellites within an orbital plane defined by a pair of mutually orthogonal and intersecting axes, wherein each orbit is represented by an eccentricity vector extending from the intersection of the orthogonal axes towards orbit perigee and wherein each eccentricity vector has a corresponding variation range, said device comprising:

eccentricity vector setting means for setting the variation ranges of the eccentricity vectors such that the variation ranges do not overlap;

predicting means for predicting motion of each satellite by measuring respective distances from the intersection of the mutually orthogonal axes and rates of change in the distances; and control means for controlling each of the satellites within the same orbital plane in accordance with the corresponding predicted motion.

4. A satellite control method for maintaining orbits of a plurality of geostationary satellites, comprising the steps of:

defining a pair of mutually orthogonal and intersecting axes representing a satellite orbital plane about a planet;

representing respective orbits of said plurality of satellites by corresponding eccentricity vectors within the orbital plane, wherein each eccentricity vector extends from the intersection of said mutually orthogonal axes to orbit perigee;

determining a variation range for each of the eccentricity vectors, wherein each variation range corresponds to changes in a corresponding elliptical satellite orbit due to solar radiation pressure and satellite NS control; and controlling the satellite orbits within the orbital plane at a substantially identical longitude of the planet such that the variation ranges do not overlap.

5. A satellite control method for maintaining geostationary satellite orbits about a planet, comprising the steps of:

defining a satellite orbital plane by a pair of mutually orthogonal and intersecting axes extending from the planet center;

representing orbits of a plurality of satellites within the orbital plane by a corresponding plurality of eccentricity vectors, wherein each eccentricity vector extends from the intersection of said mutually orthogonal axes to perigee;

determining a variation range for each of the eccentricity vectors as a circle within the orbital plane, wherein the variation ranges correspond to periodic changes in the elliptical orbits; and setting eccentricity vectors within the orbital plane such that a smallest distance between the circumferences of the vector circles is greater than a specified minimum inter-satellite distance.

6. The satellite control method according to claim 5, further comprising the step of:

controlling the orbits of the plurality of geostationary satellites within the orbital plane at a substantially identical longitude of the planet such that said plurality of circular variation ranges do not overlap.

7. A satellite control method for maintaining geosynchronous orbits of at least three satellites, comprising the steps of:

defining a satellite orbital plane about a planet by a pair of mutually orthogonal and intersecting axes extending from a planet center;

representing the orbits of said satellites by corresponding eccentricity vectors, wherein each eccentricity vector extends from the planet center to perigee of a corresponding orbit;

determining a plurality of variation ranges for each of said eccentricity vectors which respectively correspond to changes in the elliptical orbits due to solar radiation pressure and satellite NS control;

controlling satellite output thrust to maintain each satellite position within a corresponding variation range; and maintaining each of the representative eccentricity vectors during and said controlling step.

8. A satellite control device for maintaining plural geostationary satellite orbits within an orbit plane, said orbit plane being defined by a pair of mutually orthogonal axes intersecting at a planet center, wherein each of the orbits is represented by an eccentricity vector extending from an intersection of the mutually orthogonal axes towards a respective perigee, said device comprising:

means for determining a plurality of variation ranges corresponding to each of the eccentricity vectors, wherein the variation ranges correspond to influences of solar radiation pressure and NS control; and means for localizing each of the eccentricity vectors such that adjacent vectors form an angle approximating 90°.

9. The satellite control device according to claim 8, further comprising:

means for controlling each of the satellites such that the corresponding eccentricity vectors remain within the corresponding variation ranges.

* * * * *